United States Patent Office 2,909,634
Patented Oct. 20, 1959

2,909,634

PROCESS AND APPARATUS FOR CHEMICAL REACTIONS

Herbert W. Stratford, Kansas City, Kans., assignor to Stratford Engineering Corporation, Kansas City, Mo., a corporation of Delaware Application April 3, 1957, Serial No. 650,465

18 Claims. (Cl. 260—400)

This invention relates to control of chemical reactions in which gas and/or heat are liberated and refers more particularly to a method of and apparatus for manufacturing surface-active agents such as wetting, emulsifying, dispersing, penetrating and deterging agents which contain salts of organic sulphonic acids. The invention partially refers to improvements in the neutralization of an organic sulphonic acid mix which permits maintaining the temperature of the reacting materials practically constant despite the large amount of heat liberated in the reaction.

The neutralization of organic sulphonic acids suitable for use as surface-active agents is an exothermic reaction which liberates a very substantial amount of heat. If this heat is not effectively dissipated, the temperature of the reaction mixture may rise sufficiently to cause excessive deterioration of the product, particularly if pH is not maintained closely throughout the reaction mixture by rapid and complete mixing of the reactants. Serious operating difficulties may also be encountered in this and other exothermic reactions if the temperature is not controlled.

In a closed system, for example, dangerous pressures may be built up which are capable of destroying the apparatus. However, if the apparatus is not pressure-sealed, volatile components of the reaction mixture may evaporate before the reaction is complete due to the large amount of heat liberated, thus causing foaming and lack of homogeneity in the mass, which may cause additional local overheating. If carbonates or bicarbonates are used as neutralizing agents, the gases evolved as reaction products cause difficulties such as interference with the operation of pumps, foaming similar to that experienced where volatile products flash off before completion of the reaction, etc.

According to the present invention, the neutralization of organic sulphonic acids for the prouction of surface-active agents is carried out by introducing the reagents successively into a mechanically circulated and agitated mass of reaction product under sufficient pressure to maintain water or other volatile components in liquid phase, whereupon the mass still under pressure is discharged from the reaction step to an isolated zone of lower pressure to flash off a controlled amount of volatile components. From the isolated separate zone of lower pressure the flashed mixture is recycled to the reaction step to aid in temperature control of the reaction step. In this way, the temperature of the reactants is maintained by direct heat exchange with the recycled product which has been auto-refrigerated by the flash off of volatiles (the heat required for vaporization is abstracted directly from the mass). The composition of the final product is readily controlled and adjusted, and objectionable foaming of the fluid mass, which premature volatilization of volatile components might cause, is prevented.

The term "organic sulphonic acids" is meant to include those substances in which the —$SO_3H$ or —$OSO_3H$ group is attached to an organic radical and which, when neutralized, have surface-active properties and may be used as detergents, wetting, emulsifying, dispersing, penetrating agents, etc., such as, for example, sulphates and sulphonates of long-chain aliphatic hydrocarbons, higher fatty alcohols, long-chain fatty acids, polyhydric alcohol esters of fatty acids, alkyl ethers of polyhydroxy compounds, mixed aromatic and aliphatic hydrocarbons and the like.

The term "neutralizing agent" includes those substances capable of neutralizing organic sulphonic acids and may be taken from the group consisting of alkali metal and alkaline earth metal hydroxides and salts of these metals with weak acids such as carbonates and bicarbonates, aqueous ammonia, and organic bases such as the alkanolamines. It is generally preferred to employ caustic soda or soda ash as the neutralizing agent in the present invention where sodium salts are being manufactured.

The term "liquid" as used herein is intended to include within its scope true solutions, colloidal solutions and suspensions of solids in a liquid vehicle.

Therefore, an object of the present invention is to provide an apparatus for conducting exothermic chemical reactions having a flashable component in the effluent reaction mixture which does not have excessive height, the mixing vessel for conducting the reaction step being operable in a horizontal position and the entire process conductable in apparatus positioned on a single floor.

Another object of the present invention is to provide a method and apparatus for conducting exothermic chemical reactions having a flashable component in the effluent reaction mixture wherein the reaction step is conducted in a recycle stream of the reaction product, a minimum circulation time for the entire system being required, thereby providing better product check and control as to quality.

Another object of the invention is to provide a method and apparatus for conducting an exothermic chemical reaction having a flash-off step to take off a volatile component wherein the pressure reduction step is confined to one particular part of the system and apparatus and the remainder of the system and apparatus may be operated under relatively elevated pressure thereby avoiding objectionable evaporation of volatiles.

Another object of the invention is to provide method of an apparatus for conducting an exothermic chemical reaction in a recycle stream of reaction product (one of the reactant reagents being harmful if added to said recycle stream in excess) wherein an excess of the harmless reagent is first added and then dispersed in the recycle stream, then the other reagent is added and dispersed in the stream containing the excess of the first reagent, thereby avoiding or minimizing deterioration of the stream of reaction product.

Another object of the present invention is to provide a method of and apparatus for conducting an exothermic chemical reaction system wherein the reaction reagents may be sequentially added to and dispersed in a recycle stream of reaction product, the reaction product stream after addition of all reaction components being then passable into direct heat exchange relationship with the recycle stream of reaction product to control the temperature of the reaction step.

Another object of the invention is to provide method of and apparatus for conducting an exothermic chemical reaction wherein the reaction reagents are sequentially dispersed in a recycle stream of reaction product, separate turbulent dispersal areas existing in the reaction product stream whereby the reaction reagents may be separately added and completely dispersed in the recycle stream.

Another object of the invention is to provide method and apparatus for mixing reagents into a moving stream wherein the reagents are added successively to said stream and the mixing is accomplished by turbulence set up by mechanical means after each addition of reagent, thus providing means for accomplishing two-stage mixing in a constantly circulating flow.

Other and further objects of the invention will appear in the course of the following description thereof.

In the drawings, which form a part of the instant invention and are to be read in conjunction therewith, there are shown embodiments of the invention and, in the various views, like numerals are employed to indicate like parts.

Figure 1:
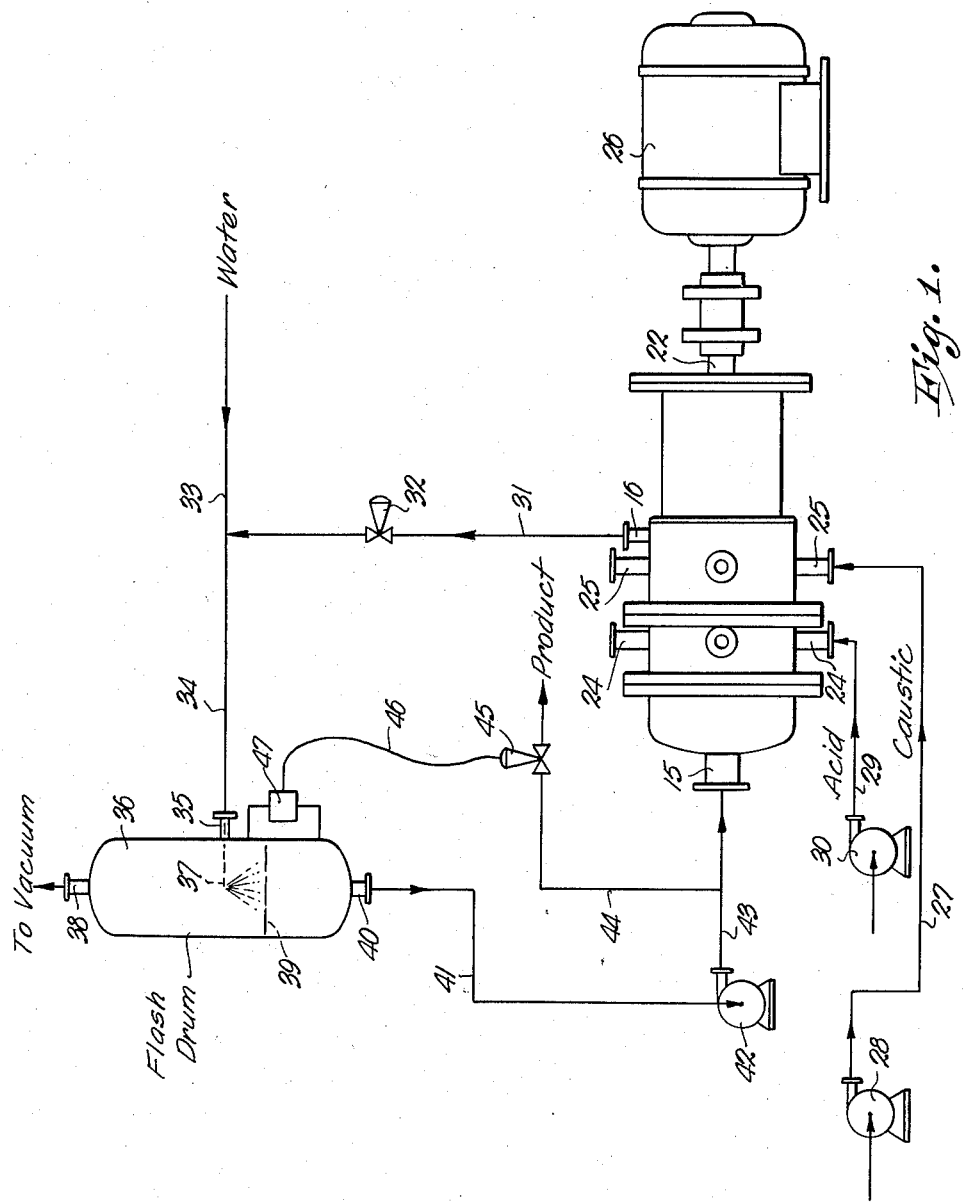
Fig. 1 is a flow chart or diagram showing the inventive method as applied in the continuous production of detergents as exemplified in the neutralization of an organic sulphonic acid with an aqueous alkali.
Figure 2:
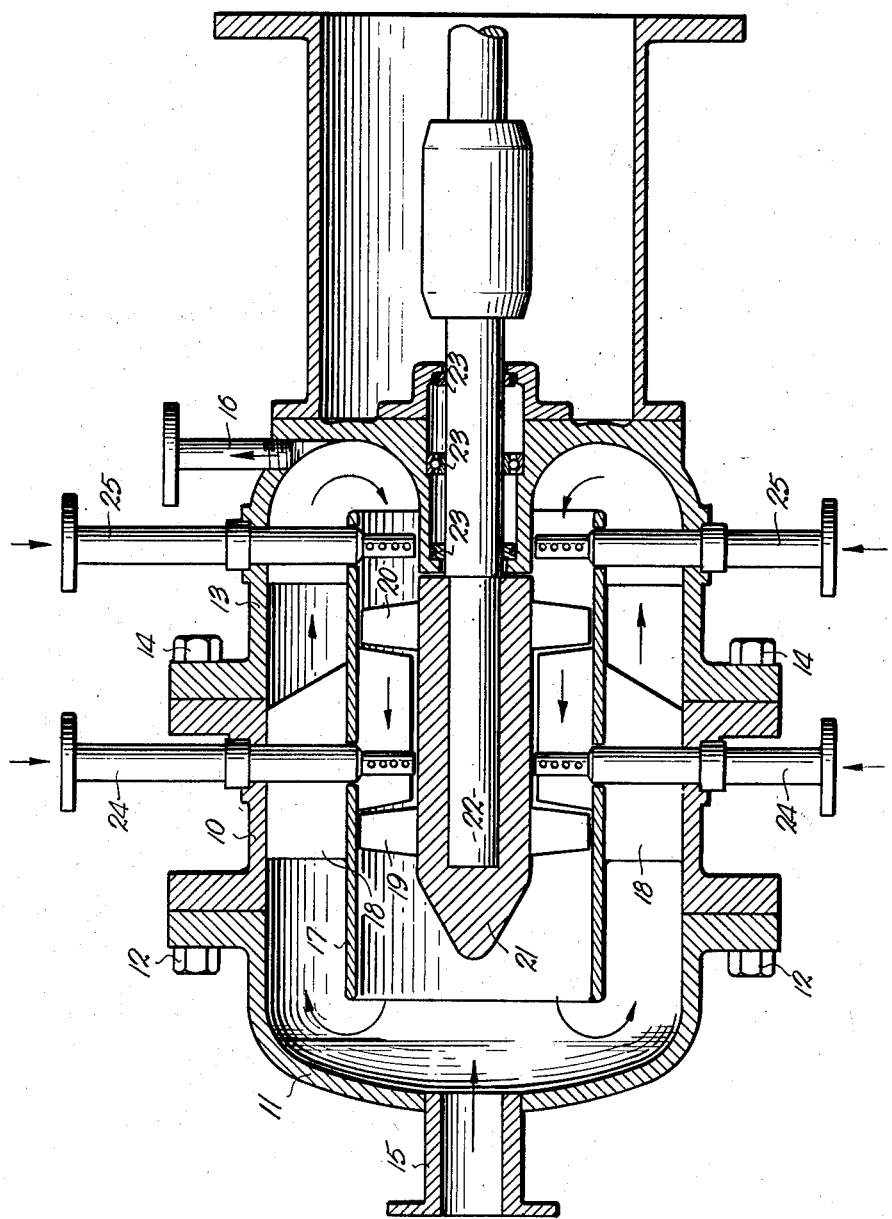
Fig. 2 is a cross-sectional view through a mixing vessel or reactor of the type shown in Fig. 1 as part of the flow diagram.

The reaction vessel shown in detail in Fig. 2 will be first described and then the operation of the method as exemplified in the schematic flow diagram of Fig. 1.

Referring, then, to Fig. 2, the reaction vessel has an outer shell 10 which is bolted to end portion 11 by bolts 12 engaging flanges on the respective portions and hydraulic head portion 13 by bolts 14 engaging flanges on each portion. The shell length 10 between the two end portions may be as long as desired, adjustability thereof being provided by the removable end portions. Recycle end portion 11 has recycle input fitting 15 centrally of the end thereof. Hydraulic end portion 13 has withdrawal nozzle 16 at the end thereof.

Circulating tube 17 is spaced inwardly from the shell 10 and extends the length thereof and into the end portions 11 and 13. Circulating tube 17 is spaced from the shell 10 by vanes 18 which also serve to support the circulating tube and regulate the turbulence of the flow of the reaction product within the vessel. The vessel is preferably operated liquid full. A pair of impellers 19 and 20 are positioned within the circulating tube and spaced longitudinally one from another. Straightening vanes may be positioned between the impellers as shown in Fig. 2. The impellers are mounted on hub 21 which is fixed to drive shaft 22, the shaft being received in bearings 23 whereby to extend outside the vessel.

A plurality of input nozzles 24 are circumferentially spaced around the vessel shell 10, preferably 90° apart and extend into the shell 10 and the circulating tube 17 between the impellers 19 and 20. A second plurality of input nozzles 25 are circumferentially spaced around the vessel in the hydraulic head assembly 13 and penetrate the wall of the vessel and the circulating tube 17 between the impeller 20 and the end of the head 13 or upstream of the impeller 20. The direction of flow inside the circulating tube is from the impeller 19 toward the recycle input opening 15.

Referring now to Fig. 1, the reaction vessel previously described is numbered therein as in Fig. 2. Drive shaft 22 is attached to motor, turbine or other power source 26. Flow line 27 having pump 28 therein connects to the input nozzles 25. Only one connection is shown in Fig. 1, as the drawing is schematic and simplification is desired. Connections may be made to the several input nozzles 25 from line 27 to obtain a uniform input of fluid from line 27 into the circulating tube upstream from the impeller 20. Flow line 29 having pump 30 therein is connected to one or more of the input nozzles 24 between the impellers.

Reaction effluent discharge line 31 having back pressure valve 32 therein is connected to the output nozzle 16. Line 31 is joined by water line 33 and line 34 leads from the junction to pressure reduction input 35 on flash drum 36. Schematically shown at 37 is the input of the pressure reduction nozzle to flash off volatiles, including water, within the flash drum 36. Fitting 38 at the top of the flash drum connects to vacuum. The liquid level in the flash drum is indicated at 39. Output fitting 40 is positioned at the bottom of the flash drum 36 and flow line 41 therefrom leads to pump 42. Line 43 leads from the pump 42 to the recycle input fitting 15. Product withdrawal line 44 having back pressure valve 45 therein is connected to line 43. Back pressure valve 45 has connection 46 to level control 47 on the flash drum 36 which regulates the amount of product withdrawn from the system relative the level of liquid in the flash drum 36.

In operation, the entire system is operated liquid full with the exception of the flash drum which is maintained at the level indicated at 39. The reaction product is circulated within the reaction vessel as may be seen in Fig. 2 with the impellers driving the liquid through the circulating tube, around it adjacent the shell and into the hydraulic head again. Product withdrawal is made through line 31 against back pressure valve 32 which maintains the reaction vessel under sufficient pressure to maintain all the mixture components in liquid phase. As the product passes to the junction with line 33, water in the desired quantity is added to refrigerate against the reaction heat and the reactor mechanical heat as well as permit proper temperature reducing flashing and the mixture is passed through line 34 into the pressure reduction fitting 35, the pressure being reduced at 37 within the flash drum. Flashable components are withdrawn through the line 38. The flashed product is maintained in the flash drum at the liquid level 39. Quantities of the flashed product are withdrawn through line 41 and passed through pump 42 to the input recycle fitting 15 of the circulating and reaction vessel. Product is withdrawn through line 44 regulated by the back pressure valve 45 connected to the liquid level regulator 47 by line 46. The recycle product, as seen in Fig. 2, is preferably input into the reaction vessel directly against the discharge stream from the two impellers. By reversing the direction of flow created by impellers 19 and 20 and repositioning the input lines so line 25 is upstream of impeller 19 feed of recycle product may be input to the impellers with material from outside the circulating tube. The illustrated sequence is preferred.

The process of reaction in the vessel is as follows: Into the circulating reaction stream within the circulating tube, an excess of caustic is continuously interspersed by input nozzles 25 connected to input line 27. The excess of caustic in the circulating reaction product does not harm the product itself as would an excess of acid. Immediately upon this excess of caustic being input into the circulating reaction product stream, the impeller adjacent the hydraulic head, numbered 20, mechanically mixes and highly disperses the excess of caustic within the circulating reaction stream. The discharge from this first impeller passes to the input nozzles 24 where it continuously receives the charge of acid put in through line 29. The input of the acid immediately begins the reaction and, essentially simultaneously, the acid-caustic reacting mix is received by the impeller 19 adjacent the recycle opening and thoroughly and mechanically mixed to permit complete and immediate reaction. Since the reaction is exothermic, the discharge from this impeller is at an elevated temperature. However, the discharge from the impeller 19 immediately meets the relatively cold continuous input recycle stream through the fitting 15 and is mixed therewith, being in turbulent condition from the latter impeller, and thus the desired temperature reduction takes place. The reaction product and finally reacting constituents are then whirled around the outside of the circulating tube and back into the interior thereof to receive another charge of reactants. The uniformity of the reaction product stream is always maintained as there is never an excess of acid therein, and, additionally, the temperature of the reaction is carefully kept under control at all times to avoid deterioration of the product from this cause as well.

From the foregoing it will be seen that the invention is adapted to attain all of the ends and objects hereinbefore set forth together with other advantages which are obvious and inherent to the apparatus and method described.

It will be understood that certain features and subcombinations are of utility and may be employed without reference to other features and subcombinations, this being contemplated by and within the scope of the claims.

As many possible embodiments may be made of the invention without departing from the scope thereof, it is to be understood that all matter hereinabove set forth is to be interpreted as illustrative and not in a limiting sense.

Having thus described my invention, I claim:

1. A method of conducting an exothermic chemical reaction between at least two reactants wherein the reaction product effluent has a flashable component comprising the steps of maintaining a body of reactant material in a vessel under subatmospheric pressure, continuously withdrawing a stream of said reactant material from said body, continuously introducing into said stream a first one of the reagents for said reaction whereby to create an excess thereof in the stream, subjecting said stream carrying the excess of said first introduced reagent thorough mechanical mixing, continuously introducing into said first reagent-rich mixed stream after said mixing a second one of said reagents for said reaction, subjecting said stream subsequent to said second addition to thorough mechanical mixing and continuously returning at least a portion of the reaction products after said second mixing step to said reactant product body.

2. A method as in claim 1 wherein the entire reaction external of said body of reacted material is maintained under relatively higher pressure than said body.

3. A method as in claim 1 with the additional step of passing the reaction mixture after said second mechanical mixing step in direct heat exchanging relationship with the flow from the reacted body to cool the reaction mixture.

4. A method as in claim 1 wherein one of the reagents unreacted in excess in the stream of reacted material would be harmful to said reaction product wherein that reagent is added in the second adding step.

5. A method as in claim 1 wherein additional flashable, volatile material is added to said stream immediately before returning the portion thereof to said aqueous body and zone of reduced pressure.

6. A method of neutralizing an organic sulphonic acid with an aqueous alkali comprising the steps of maintaining an aqueous body of neutralized material in a vessel under sub-atmospheric pressure, continuously withdrawing a stream of said material from said body, continuously introducing into said stream a first one of the reagents for said reaction, subjecting said stream carrying the excess of said first reagent to thorough mechanical mixing, continuously introducing into said first reagent-rich, mixed stream after said mixing a second one of said reagents for said reaction, subjecting said stream subsequently to thorough mechanical mixing to aid the reaction and continuously returning at least a portion of the reaction products after said mixing step to said aqueous body.

7. A method as in claim 6 wherein an organic sulphonic acid is neutralized by the addition of an aqueous alkali thereto wherein the alkali is added in the first addition step.

8. A method as in claim 6 wherein additional water is added to the portion of the reaction products after said second mixing step and immediately before introduction into said reduced pressure zone.

9. The method of neutralizing an organic sulphonic acid which comprises withdrawing a stream of reaction product from a liquid body thereof in a vessel, introducing a neutralizing agent into said stream to create an excess thereof therein, subjecting said neutralizing agent rich stream to thorough mechanical mixing, introducing after said first mixing step an organic sulphonic acid into said stream, subjecting said stream to thorough mechanical mixing after said second additional step, passing said stream into direct heat transfer relationship with the stream being withdrawn and returning said combined streams to said vessel and cooling the materials so returned by said combined streams by controlled vaporization of a volatile ingredient thereof.

10. A method of conducting chemical reactions between at least two reagents comprising the steps of establishing a flowing stream of reaction product through a confined space, introducing a first one of said reagents into said stream, subjecting the first reagent-rich stream to thorough mechanical mixing, introducing the second reagent into said first reagent-rich and mixed stream, and subjecting the stream after the introduction of the second reagent to thorough mechanical mixing.

11. A method as in claim 10 wherein each step thereof is performed immediately subsequent to the others whereby a minimum amount of time passes therebetween.

12. A method of conducting chemical reactions between at least two reagents comprising the steps of establishing a confined space through which a continuous stream of reaction product flows, establishing in said confined space a first zone for input of a first reagent, establishing in said confined space immediately downstream a first zone of mechanical mixing, establishing immediately downstream of the first mixing zone a second zone for the input of a second reagent, establishing immediately downstream of the second input zone a second zone of mechanical mixing, and continuously flowing regulated amounts of reagents into the stream of reaction product in said input zones and continuously mixing said amounts in said stream in said mixing zones.

13. In a method of reacting reagents to form a product wherein a closed cyclic flowing stream of reaction product is circulated in a flowing stream axially and peripherally of a circulating tube in a closed reaction vessel, the improvement which comprises introducing one of the reagents into said flowing stream, mechanically agitating said stream immediately after said first introduction to thoroughly mix and disperse the first reagent in the stream, introducing a second reagent into the mixed flowing stream, and mechanically agitating said stream a second time following the introduction of the second reagent to thoroughly mix and disperse said second reagent in the flowing stream so as to initiate the desired reaction, and withdrawing reaction product from the stream.

14. A method as in claim 13 wherein both mixing steps take place within the circulating tube.

15. A method as in claim 13 wherein the introduction of both reagents is within the circulating tube.

16. A method as in claim 13 wherein both mixing steps and both reagent introductions take place within the circulating tube independently of one another.

17. A method of conducting an exothermic chemical reaction between at least two reagents wherein the reaction product effluent has a flashable component comprising the steps of maintaining a body of reactant material in a vessel under subatmospheric pressure, continuously withdrawing a stream of said reactant material from said body, continuously introducing into said stream the reagents for said reaction whereby to initiate the reaction therein, subjecting said stream carrying the two reagents to thorough mechanical mixing, continuously returning at least a portion of the reaction products after said mixing to said reactant product body and passing the reaction mixture after said mechanical mixing in direct heat exchanging relationship with the flow from the reactant body to cool the reaction mixture.

18. A method as in claim 17 wherein additional flashable, volatile material is added to said stream immediately before returning the portion thereof to said reactant product body and zone of reduced pressure.

References Cited in the file of this patent

UNITED STATES PATENTS

| | | |
|---|---|---|
| 1,543,157 | Herzog | June 23, 1925 |
| 2,536,603 | Holmboe | Jan. 2, 1951 |
| 2,577,856 | Nelson | Dec. 11, 1951 |
| 2,635,103 | Molteni et al. | Apr. 14, 1953 |
| 2,690,446 | Ledgett | Sept. 28, 1954 |
| 2,720,447 | Jones et al. | Oct. 11, 1955 |